United States Patent
Misra et al.

(10) Patent No.: US 10,290,040 B1
(45) Date of Patent: May 14, 2019

(54) DISCOVERING CROSS-CATEGORY LATENT FEATURES

(71) Applicant: Amazon Technologies, Inc., Reno, NV (US)

(72) Inventors: Avishkar Misra, Sammamish, WA (US); Jody David Biggs, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 771 days.

(21) Appl. No.: 14/856,149

(22) Filed: Sep. 16, 2015

(51) Int. Cl.
| | |
|---|---|
| *G06Q 30/00* | (2012.01) |
| *G06Q 30/06* | (2012.01) |
| *G06N 3/04* | (2006.01) |
| *G06Q 30/02* | (2012.01) |
| *G06F 17/30* | (2006.01) |
| *H04L 29/08* | (2006.01) |
| *G06N 3/08* | (2006.01) |

(52) U.S. Cl.
CPC ..... *G06Q 30/0631* (2013.01); *G06F 17/30867* (2013.01); *G06N 3/04* (2013.01); *G06Q 30/0201* (2013.01); *G06Q 30/0623* (2013.01); *H04L 67/22* (2013.01); *G06N 3/082* (2013.01)

(58) Field of Classification Search
CPC .............................................. G06Q 30/0631
See application file for complete search history.

(56) References Cited

U.S. PATENT DOCUMENTS

| | | | | |
|---|---|---|---|---|
| 2007/0094168 | A1* | 4/2007 | Ayala | G06N 3/105 706/15 |
| 2010/0100416 | A1* | 4/2010 | Herbrich | G06Q 30/02 705/7.32 |
| 2010/0268661 | A1* | 10/2010 | Levy | G06Q 30/02 705/347 |
| 2013/0191409 | A1* | 7/2013 | Zeng | G06F 17/3064 707/767 |
| 2015/0046442 | A1* | 2/2015 | Bannur | G06F 17/30867 707/731 |
| 2015/0112918 | A1* | 4/2015 | Zheng | G06Q 30/02 706/48 |

(Continued)

OTHER PUBLICATIONS

Liu, Rui, Catlinks—A Category Clustering Algorithm Based on Multi-Class Regression, Nov. 1, 2014, 2014 IEEE 3rd International Conference on Cloud Computing and Intelligence Systems, pp. 323-326 (Year: 2014).*

*Primary Examiner* — William J Allen
*Assistant Examiner* — Timothy J Kang
(74) *Attorney, Agent, or Firm* — Hogan Lovells US LLP (57) ABSTRACT

The dimensionality of user data can be reduced in order to allow cross-category data to be used to determine recommendations, advertising, or other supplemental content within a specific category. A first reduction in dimensionality results from rolling up category nodes to higher-level nodes. User data for the higher-level nodes can be used to train a neural network, with a user signature being generated using node values from a hidden layer of the trained model. The user signature can then be used to train a category specific model in order to obtain category-specific recommendations, determine category-specific advertising, or select other supplemental content based at least in part upon cross-category data.

20 Claims, 6 Drawing Sheets

(56) References Cited

U.S. PATENT DOCUMENTS

2015/0170250 A1\* 6/2015 Dalal ................. G06Q 30/0643
                                                            705/26.7
2015/0379608 A1\* 12/2015 Dorner ............... G06Q 30/0631
                                                            705/26.7
2016/0267377 A1\* 9/2016 Pan ..................... G06F 17/2785
2016/0328643 A1\* 11/2016 Liu ........................ G06N 3/084

\* cited by examiner

DISCOVERING CROSS-CATEGORY LATENT FEATURES

BACKGROUND

Users are increasingly utilizing computing devices to access various types of content. Oftentimes the content is provided at little or no cost to the user, with a provider of the content obtaining monetization through the display of one or more advertisements or recommendations along with the content. If the user is viewing content for a specific product, for example, the provider might cause content for one or more other products to be recommended to the user, where the recommendations are generated using information such as products that were purchased together or otherwise obtained by similar users. For content providers such as online retailers, however, the sheer volume of data for the products available makes it impractical to utilize all the available data to generate the recommendations, which causes the recommendations to be less accurate than would otherwise be possible.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to determining supplemental content to be provided for a user in an electronic environment. In particular, various embodiments utilize a neural network-based approach to generate recommendations, select advertising, and/or perform various other such tasks. In at least some cases the amount of historical data available may be too large to enable recommendations to be generated based upon data across all categories. In order to reduce the amount of processing and resources needed, the dimensionality of the data can be reduced by first rolling categories up to higher-level nodes (i.e., parent or root nodes) in a category hierarchy. Data for the higher-level nodes can then be used to train a neural network, with a user signature being generated using values from a hidden layer of the trained model. The user signature can then be used to train a category-specific model in order to obtain category-specific values based upon the cross-category data. The category-specific values can be used to determine recommendations, advertising, or other supplemental content, within a specific category, to be displayed to the corresponding user.

Various other functions and advantages are described and suggested below as may be provided in accordance with the various embodiments.

Figure 1A:
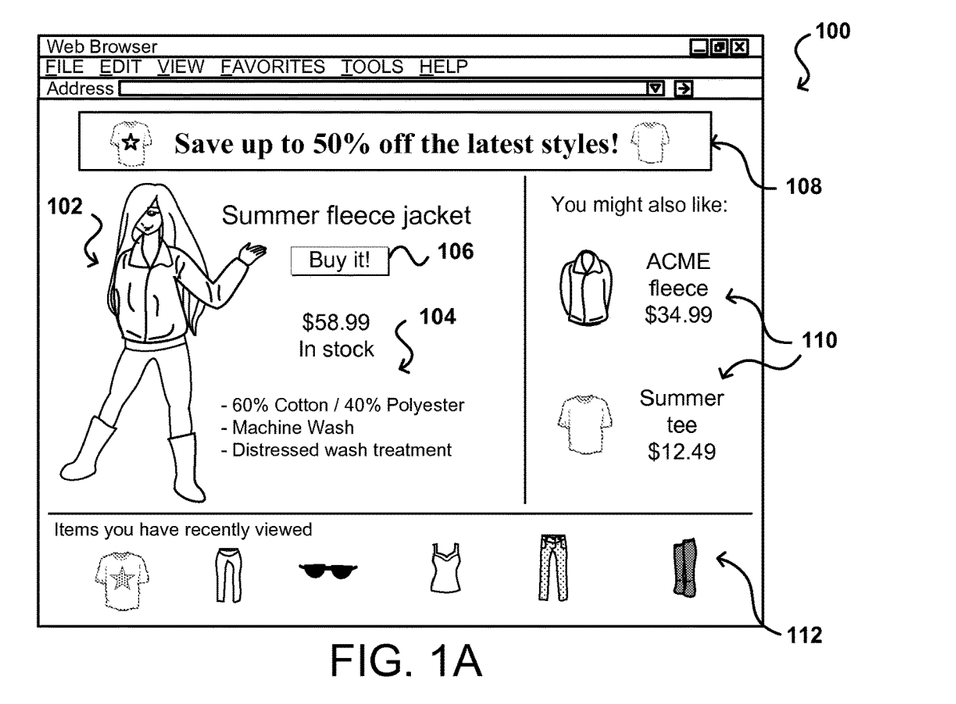
FIGS. 1A and 1B illustrate example displays of content including recommendations that can be provided in accordance with various embodiments.
Figure 1B:
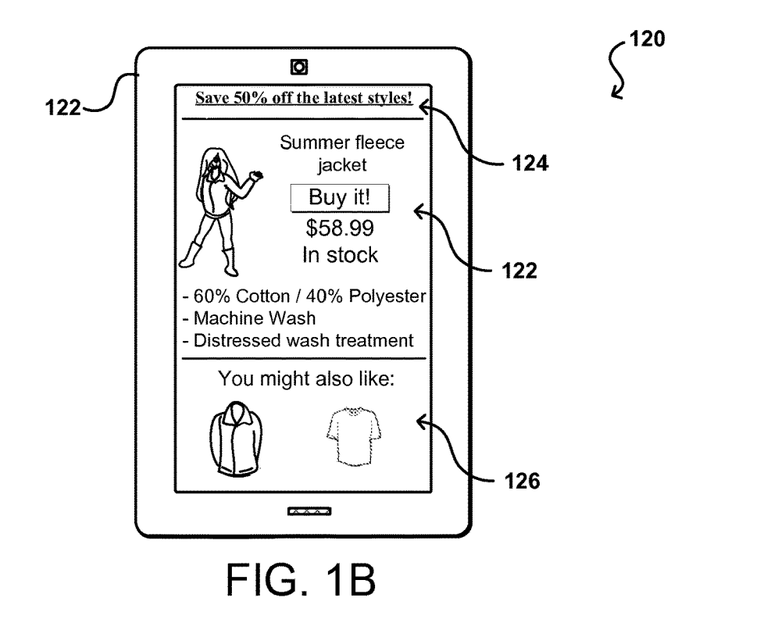

FIG. 1A illustrates an example display 100 of content that can be presented in accordance with various embodiments. In this example, a user has requested a page of content corresponding to a jacket of interest to the user. The content can include, for example, an image 102 of the jacket, a description 104 of the jacket, an option 106 to purchase the jacket, and other such information or content. The page could have been accessed through a variety of different approaches, such as may be a result of a received search query, browse, or navigation request, among other such options. While a page of content relating to an item available for consumption (i.e., purchase, rent, lease, download, stream, or otherwise obtain or access) is presented for purposes of explanation, it should be understood that other types of content, such as search results, electronic book content, multimedia content, and the like, can be presented to a user via a computing device as well within the scope of the various embodiments. As illustrated, the display 100 also includes an advertisement 108 displayed with the content. The advertisement might be provided with the content, or the code (e.g., HTML, XML, CSS, etc.) for displaying the content might include code causing one or more advertisements to be obtained from a third party and displayed with the content, according to any restrictions set by the content provider. The advertising might be selected based upon various factors, such as may include information about the object 102 of interest, or information for similar objects that may be of interest to the user. Similarly, the display 100 includes a set of recommendations 110 that include content for related objects that may be of interest to the user. The recommendations can be determined using various criteria that can be the same as, or at least partially different from, those used to select the advertising 108. In this example, the objects 110 recommended are from the same category as the object of interest 102, namely a clothing category or other such category. While a Web browser interface is shown as an example in FIG. 1, it should be understood that other types of interfaces or displays of content can be presented as well, such as the interface 120 displayed as part of a mobile app displayed on a portable computing device. This display similarly includes primary content 122 relating to an object of interest, as well as advertising content 124 and one or more recommendations 126. The content can be served, or otherwise received from, the same or different providers over the same or different networks.

In determining which advertisements and/or recommendations to provide, it can be desirable in at least some embodiments to determine content that is likely to be viewed and/or objects that are likely to be consumed by a user based at least in part upon information for the content currently being viewed. For example, given an item for which content is currently being displayed to a user, this can include determining which items should be recommended based on available information for the item and/or the user. In many embodiments there will be information 112 about items or content that the user has previously viewed, searched, or consumed, among other such options. Further, there will be information about content or objects that users consuming the current object of interest also viewed, searched, or consumed. There are many algorithms and approaches used for processing such content to determine recommendations or suggestions to be displayed to a user.

In some cases the data set available for making recommendations is too large for conventional analysis to be practical. For example, an online retailer or electronic marketplace might offer over one billion items, each with purchase and view history, user information, and other such data. It is not practical or cost effective, at least using current, conventional technology, to utilize recommendation algorithms on such large data sets for large numbers of users.

As an example, recommendations can be generated by analyzing data using a neural network-based approach. Neural network-based recommendation algorithms have been demonstrated to provide useful and appropriate recommendations for specific categories. Neural networks, in general for machine learning applications, include various statistical learning models that can be used to estimate or approximate functions using a large number of inputs. A neural network contains an interconnected group of nodes, with nodes of different layers each having a connection to each other node of at least one adjacent layer. The connections can each have a respective numeric weight that can be tuned over time, enabling the networks to be tuned according to the particular data set. A neural network generally includes three layers, including an input layer, a middle layer, and an output layer. More complex networks can have additional layers as appropriate. A neural network is typically defined by the interconnection pattern, learning process for tuning the interconnection weights, and the activation functions that generates the output activation. Neural networks can be trained using any appropriate method, such as may include expectation-maximization, non-parametric methods, evolutionary methods, gene expression programming, simulated annealing, and particle swarm optimization, among others.

Due to the computational intensity required for generating neural network-based recommendations, systems that execute such approaches often use dedicated processors, such as may be provided by machines with one or more graphics processing units (GPUs) that can be dedicated to processing of the neural network-based approach. The use of such devices can drastically reduce the amount of time needed to build and train a model for such purposes. Even with such devices, however, the limited amount of RAM on a GPU means that an excessive number of devices would need to be used to analyze a large data set, such as a product catalog for an electronic marketplace.

Figure 2:
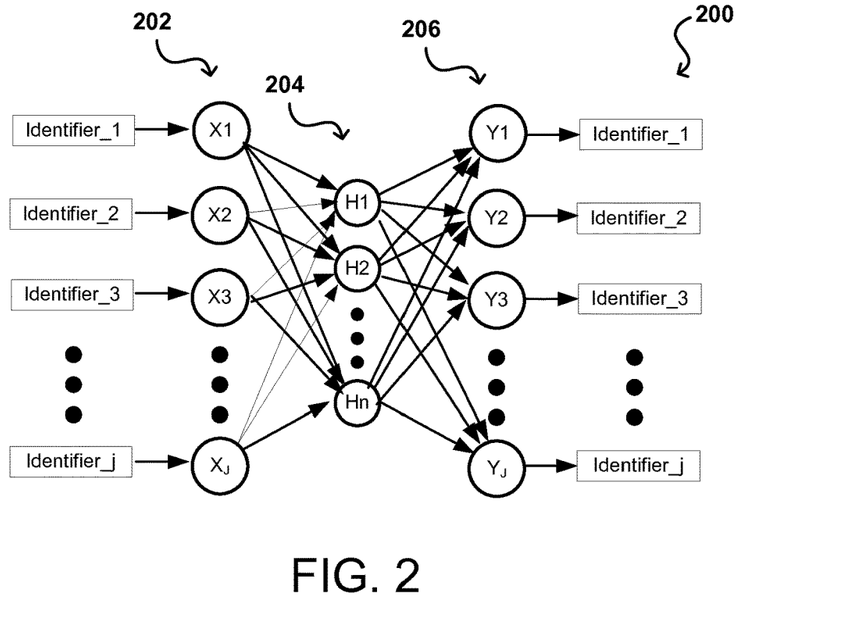
FIG. 2 illustrates an example neural network that can be used to determine related content within a specific category that can be utilized in accordance with various embodiments.

Accordingly, recommendations can be generated using data from a specific product category, where that category includes, or is directly related to, an object of interest or other identified content. For example, products to recommend for a movies category can utilize a set of data for movie-related products to select one or more movie-related products from the movies category. FIG. 2 illustrates an example neural network 200 that can be utilized in such a situation. In this example, the neural network includes an input layer 202, a "hidden" middle layer 204, and an output layer 206 of nodes. The input layer nodes 202 in this example each correspond to a specific product identifier for a product for which information is available in the data set. While bias nodes are not illustrated in the diagram, it should be understood that bias nodes or other features of neural network-based approaches can be utilized as well within the scope of the various embodiments. As illustrated, each of the input nodes 202 has a respective connection to each of the nodes of the middle layer 204. The middle layer is referred to herein as a hidden layer as the values are hidden in the network between the nodes of the input layer and the output layer. Each node of the hidden layer is referred to herein as a latent feature, which can be learned as part of the model. The input information is forced through a smaller set of hidden nodes, whereby the network is forced to pick out the most relevant signals. As mentioned, the connections from each input node to each latent feature each have a respective numerical weighting, which can be determined through training and updated over time. Using the neural network 200 of FIG. 2 for a movies category, the input nodes of the input layer 202 could each correspond to a movie that was watched by a particular user. Using the neural network, a set of output nodes could each correspond to an identifier to a movie that could be recommended to the user, where the output can also provide a confidence, relevance, or other such score that can be used to rank the recommendations. In this way, content for a number of the highest ranked items can be presented for display to the user.

A downside to using a category-specific approach, however, is that information from other categories is unavailable. For example, a user might not have watched many movies but may have purchased many science fiction books or may have viewed many items related to musicals but from other categories. This information may be beneficial in predicting the type of movies in which the user might be interested, but is not available in a category-specific approach. Using conventional approaches, however, it could take hundreds of thousands of GPUs to process a large catalog of data, which is not practical to operate or manage for such purposes and in many embodiments.

One of the benefits of neural networks is that they are good at learning various hidden characteristics of the data. This enables multiple stages of reduction to be performed on this huge dimensionality. Millions of products can be reduced to, for example, 100,000 categories or less, and a neural network can be used to produce an even smaller representation. Such a process enables a unique signature to be generated for a customer that describes the user's history (i.e., purchase, view, or otherwise) across an entire catalog of data. This can also include information such as the number of a type of item that were obtained, the price of those items, etc. Once generated, this signature can be compared against the signatures of various other users to identify users with similar signatures. For each of those users there can be information about the types of products that those people tend to purchase, view, or otherwise consume. This information can be used for a variety of different purposes, such as to recommend products, select advertising, or personalize electronic experiences for a user, among other such options. The signatures can also be used for other purposes as well, such as to identify users with similar tastes or direct the user to content associated people with a similar signature, etc., as may be useful in generating social networks or other such associations. A single category approach results in the neural networks having no opportunity to learn cross-category information, or to explicitly factor in time of activity as a signal when generating recommendations in a specific product category.

Approaches in accordance with various embodiments can attempt to utilize neural networks with an entire data set, including multiple categories, to enable the inclusion of a user's cross-category and time behavioral signals when training a category-specific model using latent features discovered through the user of neural networks. As mentioned, a latent feature vector is a vector of scores, each corresponding to a respective latent feature, that represents a signature descriptive of a user or customer. In such a process, each user's consumption or browse activity can be described for a particular object of interest in terms of a subset of browse nodes. A first set of neural networks can be trained to learn a set of cross-category browse node latent features that describe a user based on the user's consumption and view activity across all categories. The cross-category browse node latent features can then utilized as signals for a second set of neural networks trained for category specific recommendations. Such an approach can have various benefits, not limited to a dramatic reduction in the number of GPU machines needed to train the models. For example, cross-category activities (i.e., purchase, view, or search) can be described for a customer via a set of latent features (i.e., a vector of scores) that can be re-used for different prediction and analytical tasks. The cross-category latent features can also be utilized in building smaller, category-specific machine learnt models that generate category specific recommendations. These smaller models also can require significantly less data and time to train. The ability to utilize the cross-category data, along with the associated user behavioral data, enables a machine learning system to identify a user's interests, preferences, and/or intent for use in generating recommendations.

In one approach to modeling the neural networks for recommendations that bring in a user's cross-category and time behavioral signals when training a category specific model via latent features, every user's purchase and view history for a given product, with an associated product identifier, can be described in terms of a subset of browse nodes. The ability to roll up the purchase and view data under data nodes results in a first reduction in the dimensionality of the data. A data node as used herein represents a named location in a hierarchical browse tree that is used for purposes such as product classification, navigation, and primary content. Each product in an electronic catalog can have an identifier that is associated with one or more data nodes. Of these millions of data nodes or more, there can be a significantly smaller number of higher-level data nodes, such as 100,000 category data nodes or less. Of these data nodes, nodes relating to providing the primary content or other non-product specific tasks may be excluded from the analysis in at least some embodiments. Category data nodes can thus be used to represent activity for a given product, representing the first step in reducing the dimensionality in learning cross-category latent features. This approach can also be used to focus on only the most relevant products and their data node ladders over a recent period of time.

Figure 3:
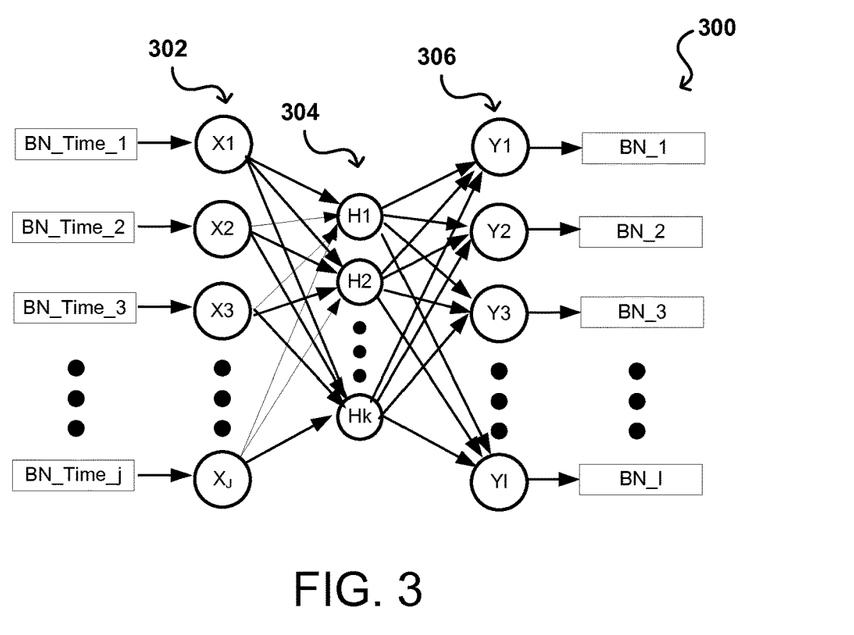
FIG. 3 illustrates an example neural network based at least in part upon browse node data that can be utilized in accordance with various embodiments.

An example process involves learning latent features based upon factors such as purchase activity, view history, query history, customer attributes, and other such information. The process of learning and generating latent space representation of user data under data nodes can involve two steps in at least one embodiment. As a first step, a neural network can be trained that can predict purchases under multiple data nodes over a determined period. An example of such a neural network 300 is illustrated in FIG. 3. In this example, an input node of the input layer 302 corresponds to activity with respect to a data node over a particular time window. In FIG. 3 there are J possible inputs to the input layer 302 of the network that predict purchases under L possible data nodes of the output layer 306, where each output node of the output layer 306 is a category data node in this example. The training of the network using a classifier or auto-encoder, for example, forces the connections through a smaller set of hidden notes result in the network selecting the most relevant information to describe the person or other entity or data for which the network is being trained. In this example the inputs are category or data nodes and time, although other types of input could be used as well within the scope of the various embodiments.

Figure 4:
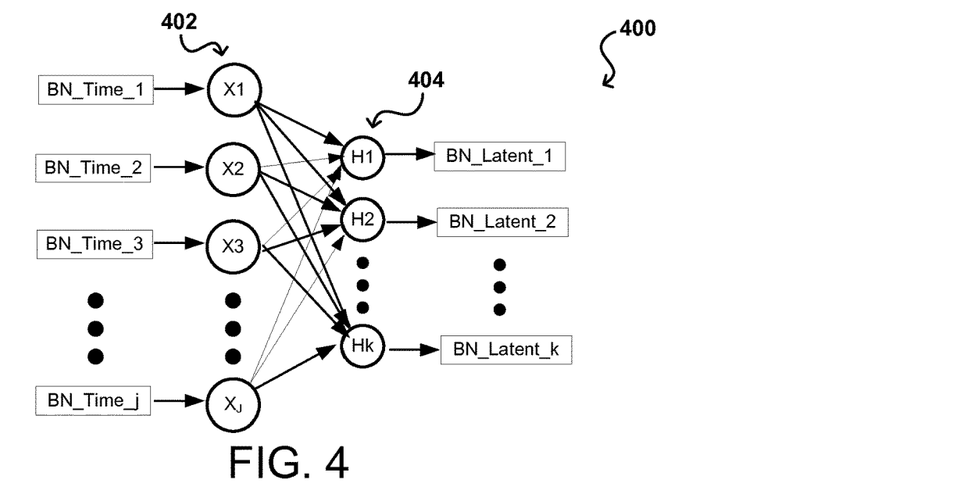
FIG. 4 illustrates an example neural network based at least in part upon browse node data, but the output layer beyond the latent features being removed, that can be utilized in accordance with various embodiments.

A second step involves removing the output layer of nodes 306 and generating a latent space representation for each customer, such as is illustrated by the modified neural network 400 of FIG. 4. In this example, the outer layer of nodes has been removed, discarded, or simply no longer considered, such that the previously hidden layer 402 of hidden latent features becomes the new effective output layer, whereby the input nodes of the input layer 402 remain associated with data under a data node over a period of time, or buckets of data associated therewith, but the output now corresponds to a latent space feature vector describing the user, where the latent space feature vector is comprised of the values of the latent feature nodes of the hidden latent feature layer 404.

The dataset from which the input is extracted can include a customer dataset in some embodiments, where the dataset is used to extract data such as customer purchases over the last year across all product categories. The data extracted can span from the start date to a cutoff date, such as one week prior to the last date of activity in the dataset. Purchase history on either side of the cut-off date can be transformed differently in at least some embodiments. For example, in some embodiments products purchased after the cutoff data can be transformed into a data node. A product can contribute to multiple data nodes that define a "data node ladder" or other path up to the category data node in the hierarchical tree. Purchases under a data node can be summed, giving a total number of purchases under each data node over the period after the cutoff. The contribution by the number of purchases under the data node can be rolled up in order to not bias the top-level data node more than lower-level data nodes. Products purchased prior to the cut-off date can be summed up into buckets represented by a combination of data node data over different time periods, such as last day, last week, last month, last year, or differences between those periods, among other such options. In situations where the number of users may be quite large, the dataset may be down sampled for training purposes in order to target a determined number of users. Since a goal of the training is to correctly describe a customer based on their current latent attributes, rather than predicting the next purchase directly, a percentage (e.g., 80%) of the customers may be selected for training with the remaining percentage used for evaluation of the trained models. This can also use data for fixed or varying time windows in some embodiments.

In some embodiments, a goal is to learn latent features that describe the purchase, view, and/or other consumption propensity across data nodes in an upcoming period of time, such as the following week, based upon what the customer has done in the past. A classifier algorithm, such as a neural network classifier (NNC) algorithm, can be used to model for that intent in at least some embodiments. NNC algorithms can work particularly well in the presence of a large number of training examples versus other similar algorithms. Latent data node-based feature learning does not generate recommendations directly, as a learning latent space representation is an intermediate step towards generating category specific recommendations. Other algorithms can be used as well, such as Sparse Auto-Encoder or other such algorithms.

At least two types of evaluations can be performed. In a first evaluation type, a latent space validation can be used to determine whether the network is correctly learning the latent space representation using information from the data node described previously, which can include information about types of items, item categories, etc. This can help to evaluate the accuracy on the data node propensity purchase model against the offline evaluation set described above. A second type of evaluation can involve the value that browse-node based latent features add in generating category-specific recommendations.

Figure 5:
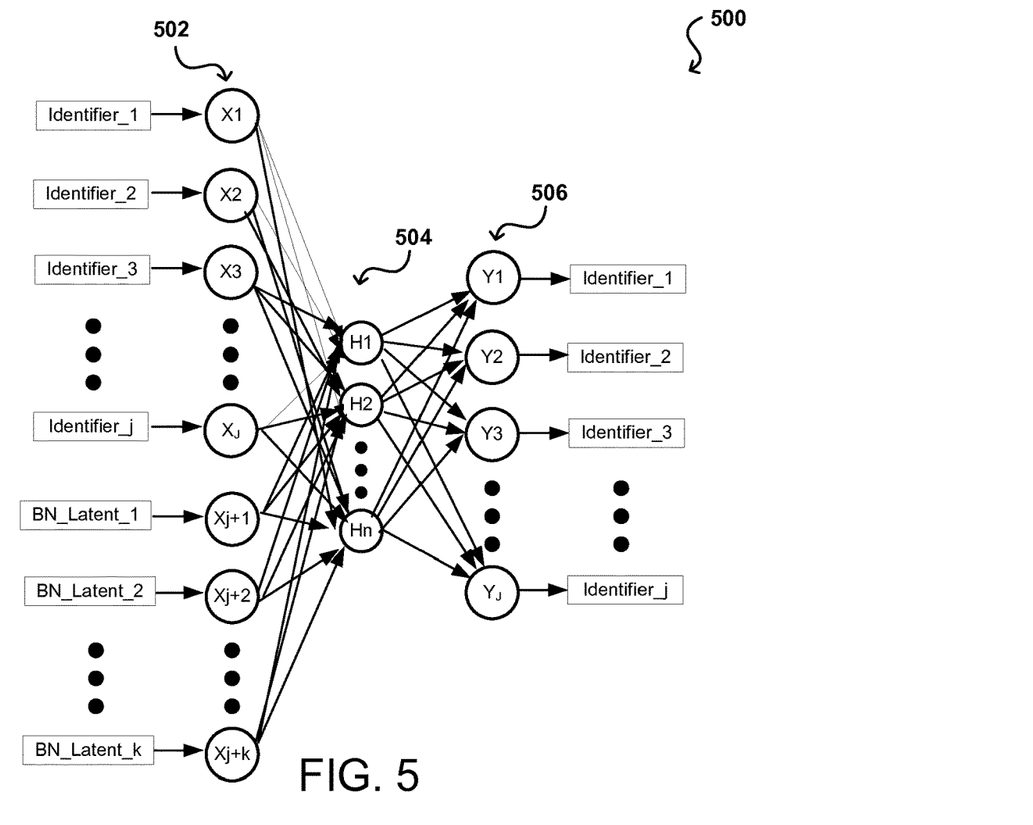
FIG. 5 illustrates an example category-specific neural network, including browse node latent features, that can be utilized in accordance with various embodiments.

Once a set of latent features, or a latent feature signature, has been generated for customers with respect to their purchase, view, search, or other such data, these features can used to train category-specific models. Instead of focusing only on products that are available within a given category as input and output nodes, binging in cross-category signals via the latent features involves adding additional input nodes to the input layer 502 as illustrated in the example neural network 500 of FIG. 5. The number of output nodes of the output layer 506 in this example would correspond to the number of products within the category, with an appropriate number of hidden latent features nodes in the hidden layer(s) 504 there between. This enables an evaluation of the recommendation algorithms against the existing baselines that established for category specific datasets. Since the dataset may be of different time-windows, it may be necessary (or at least desirable) to use two different latent-space encoders.

The process of chaining models increased complexity and add dependencies between the models versus conventional approaches. The learning of latent features using neural networks, however, replaces an important step that is part of any machine-learning pipeline, namely the engineering, generation, and/or selection of features. In a conventional approach the data can be pre-featurized and a subset of features automatically selected using simple heuristics for coverage and discriminative strength of the features. In a recommendation system, features are hand-crafted and selected a-priori by a human to help the actual model training focus on the most relevant features. The training of a data node model can replace these steps using data to automatically learn the right feature representation in latent space for subsequent training step. This can be less prone to human biases and fixed heuristics, as the full data is used to learn the correct representations.

In some embodiments, the data required for processing can be further reduced by using only that signature, or portion of a signature, for a user that applies to a specific category, or set of categories, of products. For example, a user may have a very different signature for purchasing groceries than for watching movies, and there may be no direct correlation between them. Thus, in some embodiments the system may still train models using data from multiple categories, but not necessarily all categories of the catalog. The common underlying idea is to use neural networks (or similar approaches) to reduce the dimensionality and generate a signature for comparison. Whether the entire signature of a specific portion of the signature is used may not be as important in at least some embodiments. Further, in some embodiments people can be matched, grouped, or clustered such that people with similar fingerprints can be compared in order to generate recommendations, select advertising, or perform other such tasks. This can include, for example, determine programs to suggest to users, determining which reviews to display, or otherwise selecting content to provide based on the success of displays of similar content to users with similar signatures.

In some embodiments, the data for the input nodes can be based upon object characteristics instead of item identifiers or other such data. This can help more accurately model a user based on the features of objects that appeal to the user instead of, for example, the products purchased that may include some of those features. This also helps to model catalogs where data might come from multiple sources such that the same type of object might have multiple identifiers, which then can skew the data based on the data for that type of object being split among multiple possible inputs.

Figure 6:
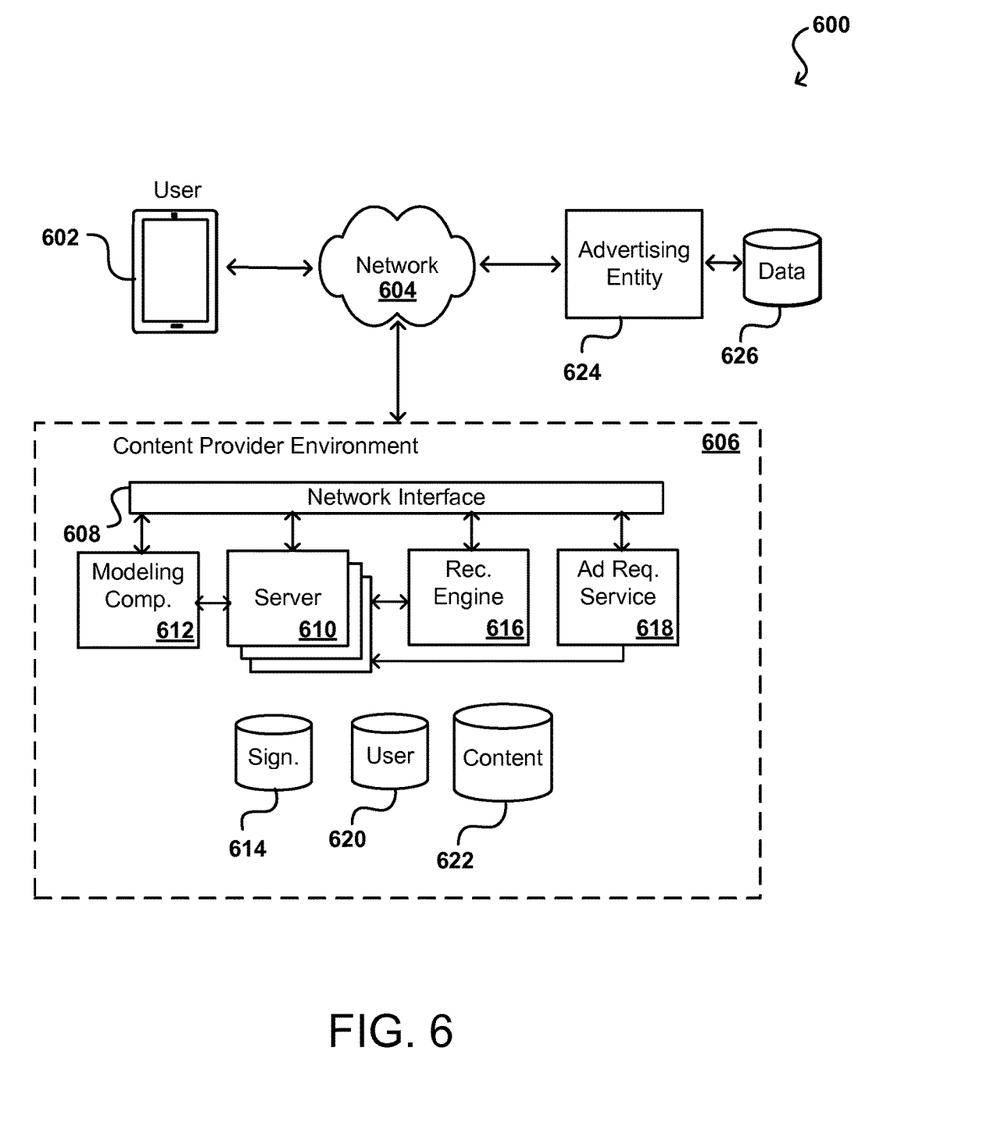
FIG. 6 illustrates an example environment in which aspects of the various embodiments can be implemented.

FIG. 6 illustrates an example environment 600 in which various embodiments can be implemented. In this example, a user is able to use a client device 602 to submit a request for content, such as a webpage or page of an electronic book, across at least one network 604. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, wearable computers (i.e., smart watches and glasses) and portable media players, among others. The at least one network 604 can include any appropriate network, such as may include the Internet, an Intranet, a local area network (LAN), a cellular network, a Wi-Fi network, and the like. The request can be sent to an appropriate content provider environment 606, which can provide one or more services, systems, or applications for processing such requests. The content provider can be any source of digital or electronic content, as may include a website provider, an online retailer, a video or audio content distributor, an e-book publisher, and the like.

In this example, the request is received to a network interface layer 608 of the content provider environment 606. The network interface layer can include any appropriate components known or used to receive requests from across a network, such as may include one or more application programming interfaces (APIs) or other such interfaces for receiving such requests. The network interface layer 608 might be owned and operated by the provider, or leveraged by the provider as part of a shared resource or "cloud" offering. The network interface layer can receive and analyze the request from the client device 602, and cause at least a portion of the information in the request to be directed to an appropriate system or service, such as a server 610 (e.g., a Web server or application server), among other such options. In the case of webpages, for example, at least one server 610 might be used to generate code and send content for rendering the requested Web page. In cases where processing is to be performed, such as to generate search results, perform an operation on a user input, verify information for the request, etc., information might also be directed to at least other server 610 for processing. The servers or other components of the environment might access one or more data stores, such as a user data store 620 that contains information about the various users, and one or more content repositories 622 storing content able to be served to those users.

As mentioned, in at least some embodiments the content to be provided can include data for one or more recommendations, advertisements, or other such elements that are selected based on information for the user associated with the request. These elements can be determined using a user-specific signature that can be generated using a modeling component 612 or other such system, service, or component discussed herein. The modeling component is shown to be included in the provider environment 606 in this example, although it should be understood that the modeling, signature generation, or other such tasks can be performed outside the environment by a third party provider or other such entity. The modeling component can analyze data for the user from across multiple categories to generate at least one user-specific signature, which can be stored in a signature repository 614, user data store 620 or other such location.

Once the appropriate components of the content provider environment 606 have determined the appropriate information, a response can be returned to the client device 602 over the network. This can include any relevant content, as well as code and/or script for rendering the content. The relevant content can include images, links, description, or other content for one or more recommendations, as may be determined using a recommendation engine 616 or other such component, system, or service, which can utilize a signature for the user in order to determine the appropriate recommendations to be provided with the primary content. If advertising is to be included with the display of content, the code can also include code, links, or other information for obtaining the advertising. As discussed, this can include code for controlling display properties of the ad, as well as a call to one or more advertising entities 624 to obtain information for the advertisement, as may include text and/or image information stored in at least one data store 626. Where the ad is to be provided from an advertising entity, a browser application on client device 602 in some embodiment can be caused to submit a request to the advertising entity 624 across the network 604, which can return a response including the image, text, or other information for the ad(s) to be displayed. The request can include any appropriate information for selecting an ad to display as known in the art for such purposes. In some embodiments, the script on the page can cause a request to be submitted to an ad request service 618, or other such component, that can communicate with the advertising entity 624 and then package the active script with the advertising content for submission to the client device 602. In other embodiments, the advertising and script will be determined by the ad request service 618 when the page is rendered, and the information will all be sent together to the client device 602. In at least some embodiments, the ad request service is configured to first determine whether the user and/or client device has opted in to, or out of, the tracking of client side metrics before including the active script with the ad response. Information about any interaction of the client device with the primary content, recommendations, and/or advertising can be logged or otherwise stored for subsequent recommendations, training, or other such purposes.

Figure 7:
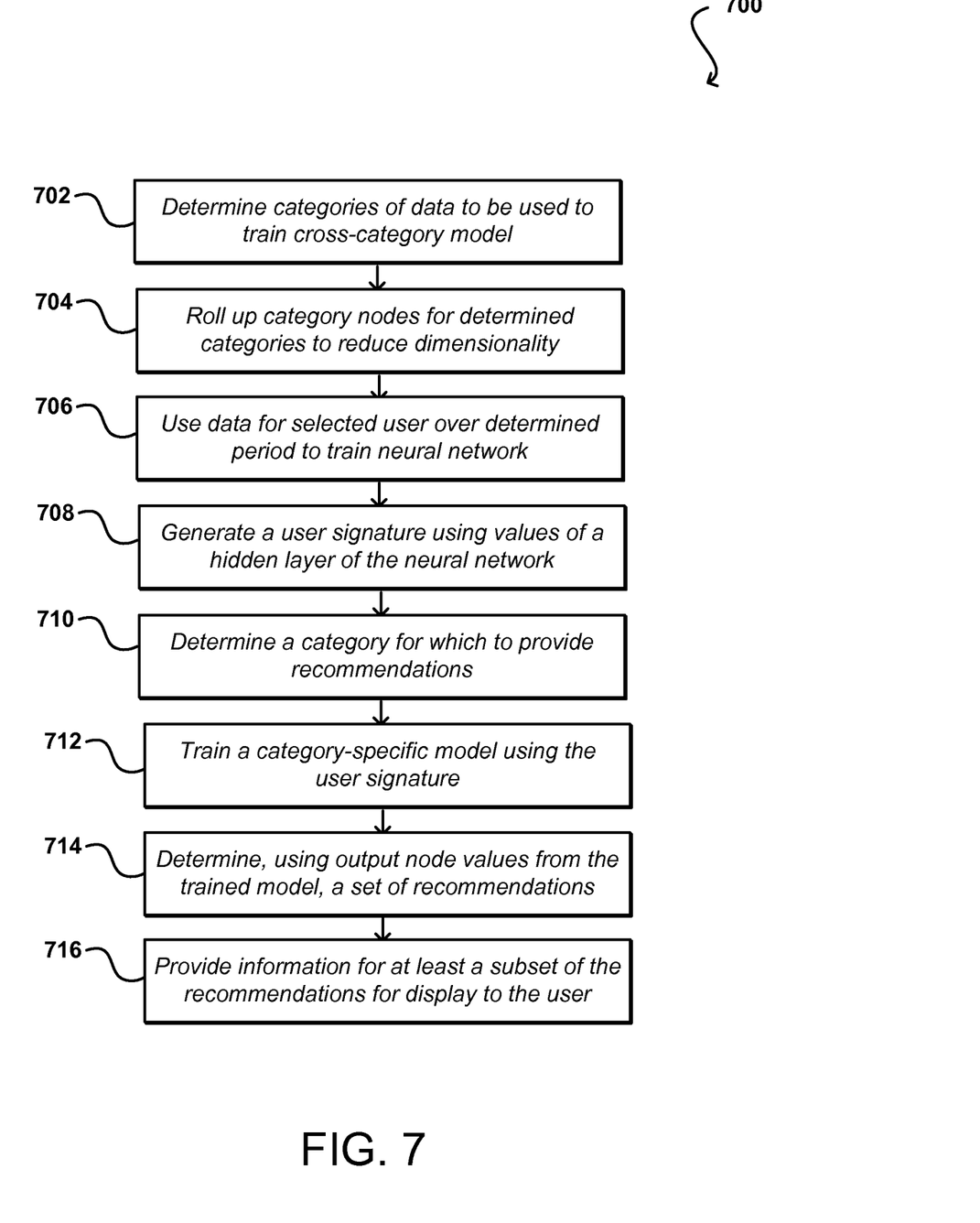
FIG. 7 illustrates an example process for determining category-specific recommendations using cross-category data that can be utilized in accordance with various embodiments.

FIG. 7 illustrates an example process 700 for determining category-specific recommendations using cross-category data that can be utilized in accordance with various embodiments. It should be understood that there can be additional, fewer, or alternative steps performed in similar or alternative orders, or in parallel, within the scope of the various embodiments unless otherwise stated. In this example, categories of data to be used to train a cross-category model are determined 702. This can include, for example, selecting all nodes for which relevant historical data is available, or a subset of those nodes based on and of a number of selection criteria as discussed and suggested herein. In some embodiments, these nodes correspond to object categories or other such groupings. The determined nodes can be rolled up 704 to category nodes, or other such nodes of a hierarchical node tree, in order to perform a first reduction of the dimensionality of the data. Data for the selected user over at least one determined period of time can then be used 706 to train a neural network using the data for the appropriate input nodes of the network. As mentioned, in some embodiments a subset of the data can be used to train the model, with a remaining portion of the data capable of being used to test the model, among other such options. Once the network is sufficiently trained, a user signature, feature vector, or other such sequence of values can be generated 708 using values of nodes of a hidden layer of the trained neural network A specific category can be determined 710 for which to provide recommendations, although advertising and other supplemental content can be determined using such an approach as well within the scope of the various embodiments. A category-specific model can then be trained 712 using values from at least a portion of the user signature. A set of recommendations can be determined 714 using the values of the output nodes of the trained category-specific model. As mentioned, the values in some embodiments are product identifiers with an associated confidence or relevance score, among other such options. Information for at least a subset of the recommendations, such as a number of highest-ranked recommendations, can then be provided 716 for display to the user, such as may be displayed with a set of primary content of interest to, or requested by, a client device associated with the user.

Figure 8:
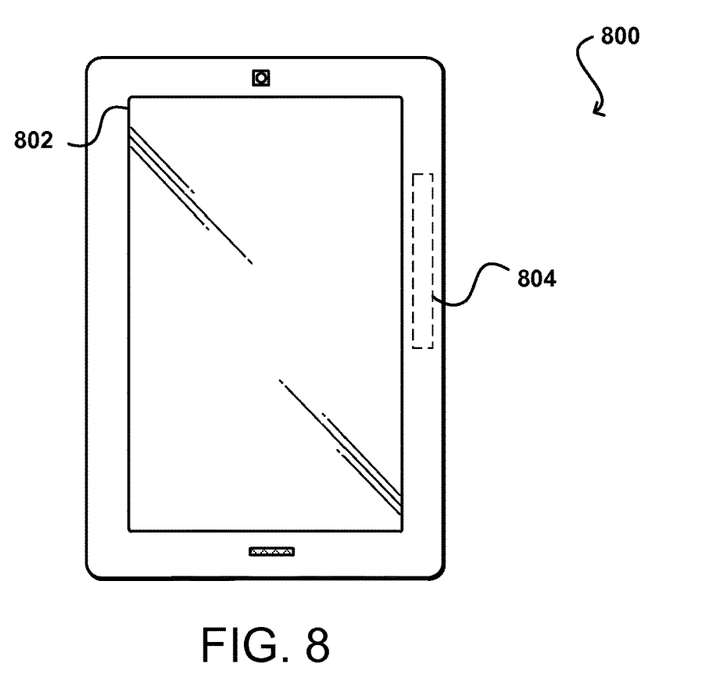
FIG. 8 illustrates an example device that can be used to implement aspects of the various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 800 has a display screen 802 on the front side, which under normal operation will display information to a user facing the display screen (e.g., on the same side of the computing device as the display screen). It should be understood that computing devices such as servers, however, may not have dedicated display elements. The example computing device 800 also includes at least one networking component 804, such as a network interface card, wireless networking component, and the like, enabling the computing device to communicate information over at least one network.

Figure 9:
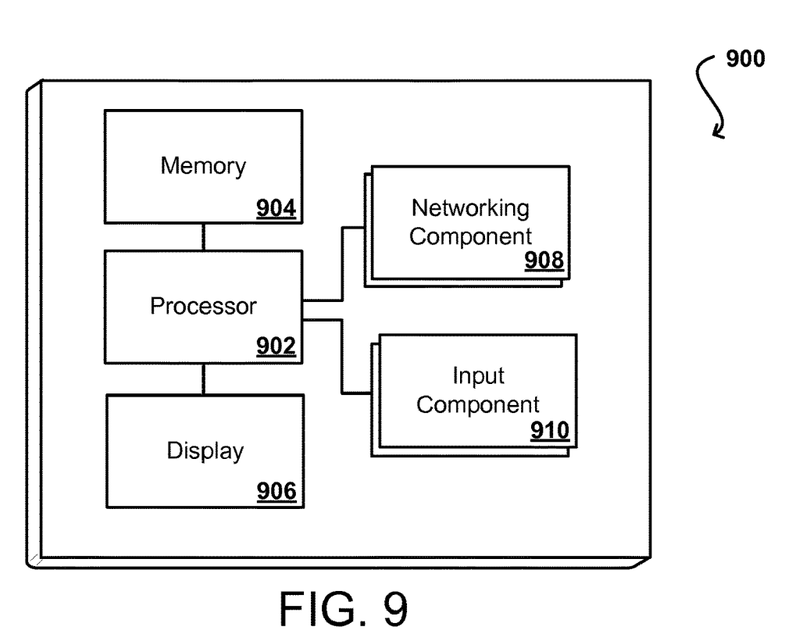
FIG. 9 illustrates example components of a client device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. In some embodiments, the computing device 900 of FIG. 9 can include one or more networking and/or communication elements 908, such as a Wi-Fi, Bluetooth, RF, wired, or wireless communication system. The device in many embodiments can communicate with a network, such as the Internet, and may be able to communicate with other such devices. In some embodiments the device can include at least one additional input component 910 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    obtaining, by a processor, user data for each of a plurality of categories, the user data representing historical user interaction, with respect to objects in the plurality of categories, over at least one determined period of time;
    training, by the processor, a neural network using the user data, the neural network including an input layer of nodes, an output layer of nodes, and at least one middle layer of nodes, each node of the at least one middle layer of nodes representing a respective non-binary latent feature value of the model;
    generating, by the processor, a user signature using the non-binary latent feature values of a middle layer of the neural network;
    training, by the processor, a category-specific model for at least one specified category using the user signature and category-specific data, the category-specific model including a plurality of output values each indicating a likelihood of a type of interaction of a user with a respective object;
    receiving by the processor, a request to display content, the request associated with the user and corresponding to a specified category;
    determining, by the processor, a set of recommendations using the output values of the category-specific model for the specified category; and
    providing, by the processor, information for at least a subset of the recommendations to be displayed with the content.

2. The computer-implemented method of claim 1, further comprising:
    obtaining the user data for an initial set of categories, at least a subset of the initial set of categories being subcategories of a respective higher-level category; and
    rolling up at least the subset of the initial set of categories, wherein the plurality of categories used to train the neural network corresponds to the higher-level categories of the initial set of categories.

3. The computer-implemented method of claim 2, further comprising:
    determining a subset of the higher-level categories that is relevant to the specified category; and
    considering only the user data for the subset of the higher-level categories to train a version the neural network to generate a category-relevant user signature.

4. The computer-implemented method of claim 1, further comprising:
    determining a portion of the user signature that is relevant to the specified category; and
    considering only the determined portion of the user signature to train the category-specific model.

5. A computer-implemented method, comprising:
- obtaining, by a processor, a data set including historical data for a set of categories, at least a portion of the historical data relating to a specified entity
- training, by the processor, a neural network, the neural network including an input layer including a first set of input values corresponding to the historical data, at least one middle layer including a plurality of non-binary latent value, and an output layer including output data values;
- generating, by the processor an entity signature for the entity using at least a subset of the plurality of non-binary latent values of a middle layer of the neural network; and
- training, by the processor, a category-specific model for at least one specified category using the entity signature and the historical data for the set of categories, the category-specific model including a plurality of output values each indicating a likelihood of a type of interaction of a user with a respective object.

6. The computer-implemented method of claim 5, further comprising:
- determining a group of categories for which historical data is available; and
- rolling up at least a subset of the group of categories to obtain a set of higher-level category nodes, the set of higher-level category nodes corresponding to the set of categories used for training the neural network.

7. The computer-implemented method of claim 5, wherein the entity signature is a feature vector including a plurality of feature values, each feature value corresponding to a node of the middle layer of the neural network.

8. The computer-implemented method of claim 5, further comprising:
- receiving a request for content corresponding to a determined category;
- obtaining a set of output values of the category-specific model for the determined category; and
- providing supplemental content for at least a subset of the set of output values.

9. The computer-implemented method of claim 8, wherein the supplemental content includes at least one of content for one or more recommended objects or advertising content.

10. The computer-implemented method of claim 5, further comprising:
- determining a set of other entities with signatures similar to the entity signature; and
- determining a set of recommendations based at least in part upon historical data for the set of other entities with respect to objects of a determined category.

11. The computer-implemented method of claim 5, wherein the neural network includes at least one of a plurality of input layers, a plurality of output layers, or a plurality of middle layers, and wherein the entity signature for the entity is generated using latent values of two or more layers of the neural network.

12. The computer-implemented method of claim 5, further comprising:
- discarding the output data values of the output layer after the training of the neural network.

13. The computer-implemented method of claim 5, wherein the historical data includes at least one of view data, product data, consumption data, search data, purchase data, or interaction data.

14. The computer-implemented method of claim 5, further comprising:
- receiving a request to display content corresponding to a determined category; and
- customizing a selection of the content to be displayed using the entity signature.

15. The computer-implemented method of claim 5, further comprising:
- determining at least one other entity with a similar entity signature; and
- introducing the entity to the at least one other entity through a social network.

16. A system, comprising:
- at least one processor;
- memory storing instruction that, when executed by the at least one processor, cause the system to:
  - identify a data set including historical data for a set of categories, at least a portion of the historical data relating to a specified user;
  - train a neural network, the neural network including an input layer including a first set of values corresponding to the historical data, at least on middle layer including a plurality of non-binary latent values, and an output layer including output data values;
  - generate a user signature for the user based at least in part on the plurality of non-binary latent values of a middle layer of the neural network; and
  - train a category-specific model for at least one specified category using the user signature and the data set including historical data for the set of categories, the category-specific model including a plurality of output values each indicating a likelihood of a type of interaction of a user with a respective object.

17. The system of claim 16, wherein the instructions when executed further cause the system to:
- determine a group of categories for which historical data is available; and
- roll up at least a subset of the group of categories to obtain a set of higher-level category nodes, the set of higher-level category nodes corresponding to the set of categories.

18. The system of claim 16, wherein the instructions when executed further cause the system to:
- receive a request for content corresponding to a determined category;
- obtain a set of output values of the category-specific model for the determined category; and
- provide supplemental content for at least a subset of the set of output values, wherein the supplemental content includes at least one of recommended objects, customized content, or advertising content.

19. The system of claim 16, wherein the instructions when executed further cause the system to:
- cause the neural network to be trained using historical data for each of a plurality of time periods.

20. The system of claim 16, wherein the instructions when executed further cause the system to:
- use a first portion of the data set to train the neural network and a second portion of the data set to test the neural network.

* * * * *